United States Patent
Katuri et al.

(10) Patent No.: US 9,689,583 B2
(45) Date of Patent: Jun. 27, 2017

(54) OCCUPANCY BASED ENERGY OPTIMIZATION SYSTEMS AND METHODS

(71) Applicant: Honeywell International Inc., Morristown, NJ (US)

(72) Inventors: SrinivasaRao Katuri, Bangalore (IN); Steve Huseth, Plymouth, MN (US); Amit Kulkarni, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 207 days.

(21) Appl. No.: 14/023,256

(22) Filed: Sep. 10, 2013

(65) Prior Publication Data

US 2015/0068721 A1    Mar. 12, 2015

(51) Int. Cl.
*F24F 11/00* (2006.01)
*H04L 29/08* (2006.01)
*H04L 12/28* (2006.01)

(52) U.S. Cl.
CPC ...... *F24F 11/0034* (2013.01); *H04L 12/2816* (2013.01); *H04L 67/125* (2013.01); *F24F 2011/0035* (2013.01); *F24F 2011/0036* (2013.01)

(58) Field of Classification Search
CPC .. F24F 11/0034; F24F 2011/0036; F24F 3/00; F24F 2011/0035; H04L 12/2816; H04L 67/125
USPC ..... 165/200, 237; 62/89, 131; 236/46, 46 A, 236/47; 348/155
See application file for complete search history.

(56) References Cited

U.S. PATENT DOCUMENTS

| | | | | |
|---|---|---|---|---|
| 6,222,191 B1* | 4/2001 | Myron | ............... | G08B 13/193 250/340 |
| 6,331,964 B1* | 12/2001 | Barone | ............... | G01S 13/52 367/128 |
| 7,123,139 B2* | 10/2006 | Sweeney | ............... | 340/521 |
| 8,510,255 B2* | 8/2013 | Fadell | ............... | H05B 37/0227 706/52 |
| 2003/0096572 A1 | 5/2003 | Gutta et al. | | |
| 2008/0277486 A1 | 11/2008 | Seem et al. | | |
| 2009/0065596 A1* | 3/2009 | Seem | ............... | F24F 11/0009 236/51 |
| 2010/0109934 A1* | 5/2010 | Drake et al. | ............... | 342/28 |
| 2010/0318226 A1* | 12/2010 | Augusto | ............... | F24F 3/00 700/277 |
| 2011/0127340 A1* | 6/2011 | Aiken | ............... | 236/49.3 |

(Continued)

FOREIGN PATENT DOCUMENTS

| | | |
|---|---|---|
| EP | 2363657 A2 | 9/2011 |
| EP | 2581677 A1 | 4/2013 |

OTHER PUBLICATIONS

Extended Search Report and Written Opinion from related European Application 14181869.0 dated Oct. 29, 2015, 6 pp.

*Primary Examiner* — Jianying Atkisson
*Assistant Examiner* — Raheena R Malik
(74) *Attorney, Agent, or Firm* — Brooks, Cameron & Huebsch, PLLC

(57) ABSTRACT

A method for occupancy based energy optimization can include determining a size and speed of a number of objects within an area, determining a number of human occupants within the area based on the size and speed of the number of objects within the area, and altering a number of environmental settings for the area based on the determined number of human occupants.

18 Claims, 3 Drawing Sheets

(56) References Cited

U.S. PATENT DOCUMENTS

| | | | |
|---|---|---|---|
| 2011/0205366 A1* | 8/2011 | Enohara et al. | 348/159 |
| 2012/0066168 A1* | 3/2012 | Fadell | H05B 37/0227 706/52 |
| 2012/0085831 A1* | 4/2012 | Kopp | 236/46 A |
| 2012/0209567 A1* | 8/2012 | Imahara et al. | 702/181 |
| 2012/0234179 A1* | 9/2012 | Miki et al. | 96/397 |
| 2012/0248209 A1* | 10/2012 | Reid | 236/51 |
| 2012/0253522 A1 | 10/2012 | Kobayashi | |
| 2012/0310417 A1* | 12/2012 | Enohara | G06K 9/00771 700/276 |

* cited by examiner

OCCUPANCY BASED ENERGY OPTIMIZATION SYSTEMS AND METHODS

TECHNICAL FIELD

The present disclosure relates to occupancy based energy optimization systems and methods.

BACKGROUND

Heating, ventilation, and air conditioning (HVAC) systems can utilize a schedule that includes "working hours" and "non-working hours" to predict occupancy of an office building. The HVAC system can be at a maximum level of operation during the "working hours" and at a lower level of operation during the "non-working hours". The HVAC system makes an assumption that the occupancy of the office building will have a higher occupancy during the "working hours" compared to the "non-working hours" and therefore will require a greater level of operation during "working hours".

DETAILED DESCRIPTION

A method for occupancy based energy optimization can include determining a size and speed of a number of objects within an area, determining a number of human occupants within the area based on the size and speed of the number of objects within the area, and altering a number of environmental settings for the area based on the determined number of human occupants.

Occupancy based energy optimization can utilize high frequency sensors (e.g., microwave sensors, etc.) within a number of areas (e.g., rooms, atriums, offices, etc.) of a building (e.g., office building, etc.). The high frequency sensors can be utilized to count a number of human occupants within each of the number of areas. The high frequency sensors can be utilize to estimate a size and speed of a number of objects to determine if the number of objects include human occupants.

Occupancy based energy optimization can utilize a number of soft sensors to determine and/or confirm the human occupants within each of the number of areas. The number of soft sensors can include various devices that are not specifically designated to determine occupancy and/or count a number of individuals within an area. For example, the number of soft sensors can include, but is not limited to: Wi-Fi access points, calendar software, instant messaging software, time of day software, security systems, among other devices and/or software.

The high frequency sensors and the number of soft sensors can be utilized to determine a quantity of human occupants within each area. The quantity of human occupants within each area can be utilized to alter a number of environmental settings for each area. For example, a heating, ventilation, and air conditioning (HVAC) system can be utilized to control the number of environmental settings for the number of areas. In this example, data relating to the determined quantity of human occupants can be utilized to alter settings of HVAC system to optimize energy efficiency of the HVAC system.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of soft sensors" can refer to one or more soft sensors.

Figure 1:
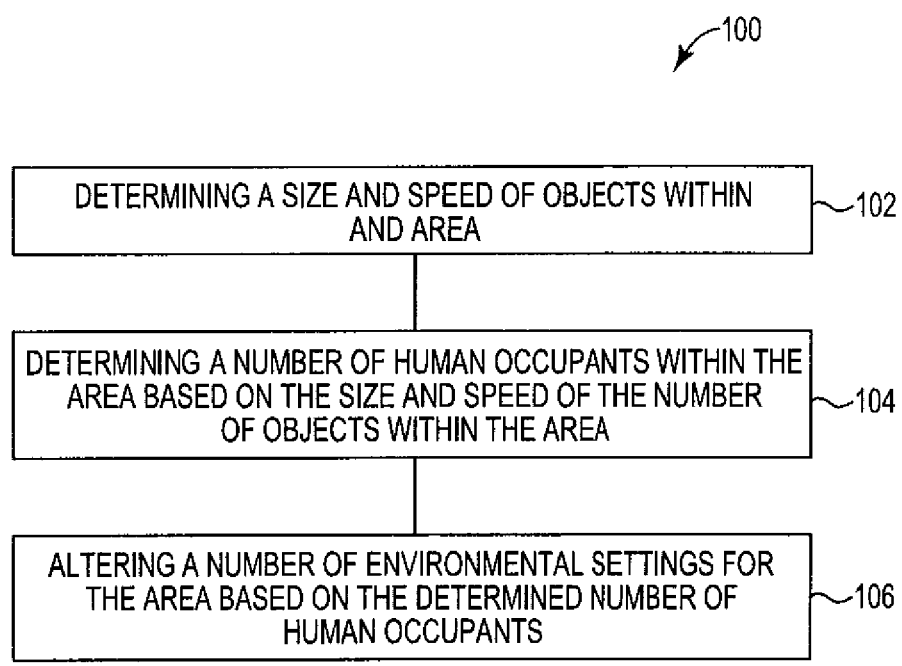
FIG. 1 illustrates an example of a method for occupancy based energy optimization in accordance with one or more embodiments of the present disclosure.

FIG. 1 illustrates an example of a method 100 for occupancy based energy optimization in accordance with one or more embodiments of the present disclosure. Occupancy based energy optimization can include altering a number of settings of an environmental control system (e.g., HVAC system, home thermostat, etc.) based on a current occupancy (e.g., real time occupancy, occupancy data, etc.) of areas within a building. For example, occupancy data (e.g., data relating to a quantity of human occupants at particular times of day, data relating to a quantity of human occupants at particular outdoor temperatures, etc.) within a number of areas of the building can be determined in real time and be utilized to alter the settings of an HVAC system in real time to accumulate the occupancy within each of the number of areas.

At box 102 the method 100 can include determining a size (e.g., area of the object, density of the object, shape of the object, etc.) and speed (e.g., frequency of movement, direction of movement, type of movement, velocity of movement, etc.) of a number of objects within an area. Determining a size and speed of the number of objects within the area can include utilizing a high frequency sensor (e.g., microwave sensor, radar sensor, Doppler sensor, etc.) to scan the number of objects within the area. For example, a high frequency sensor can be utilized to scan a room within a building and determine the size and speed of each of the objects within the room.

The high frequency sensor can send wave pulses through an area and determine changes in the reflection of the wave pulses to determine a size and/or movement speed of the number of objects within the area. The high frequency sensor can utilize wave pulses that are similar or the same as microwaves. The high frequency sensor can be an active sensor that periodically sends wave pulses (e.g., microwaves, ultrasonic waves, etc.) through the area.

Each of the number of objects within the area can reflect the wave pulses in a particular way. For example, objects having a relatively larger size can reflect the wave pulses differently than objects having a relatively smaller size. In another example, objects that are moving can reflect wave pulses differently than objects that are not moving. Each of the number of objects can be scanned and analyzed by the high frequency sensor to determine a quantity of human occupants within the area.

At box 104 the method 100 can include determining a number of human occupants within the area based on the size and speed of the number of objects within the area. Determining the number of human occupants within the area can include determining if the size and speed of the number of objects are consistent with a size and speed of a human occupant. For example, the high frequency sensor can determine a size and/or shape of each of the number of objects within the area. In this example, the size and/or shape of each of the number of objects can be compared to a predetermined size and/or shape of a human occupant.

In an additional example, the high frequency sensor can determine a speed and/or movement of each of the number of objects. The determined speed and/or movement of each of the number of objects can be compared to a predetermined speed and/or movement of a human occupant. That is, a relative size and speed of human occupants can be determined and utilized to compare to a currently detected size and speed of objects within an area to determine a number of human occupants and/or a number of non-human occupants.

Determining the number of human occupants can also include utilizing a number of soft sensors (e.g., Wi-Fi access points, calendar software, instant messaging software, time of day software, security systems, scheduling programs, etc.). The number of soft sensors can be utilized to confirm the number of human occupants within the area that are determined by the high frequency sensors.

In some embodiments, the number of soft sensors can be utilized to determine the number of human occupants without utilizing the high frequency sensor. For example, the number of soft sensors can be utilized to determine the number of human occupants within the area. In this example, the accuracy of the number of human sensors within the area can be increased by utilizing a plurality of soft sensors and utilizing data from the plurality of soft sensors to determine the number of human occupants.

Confirming the number of human occupants can include utilizing the number of soft sensors to determine a schedule of the number of human occupants. For example, the number of soft sensors can include calendar software to determine an expected location of the number of human occupants. That is, if it is determined that a particular human occupant is scheduled to be in a particular area at a particular time, it can be confirmed that the particular human occupant is within the particular area when it is determined by the high frequency sensor that the particular human occupant is within the area.

Confirming the number of human occupants can also include utilizing the number of soft sensors to determine granted access to a particular area. For example, the number of soft sensors can include utilizing a security system. The security system can include a number of access points (e.g., RFID tag readers, etc.). Data can be collected from the number of access points that grants access to a particular area. The data that is collected from the number of access points can include identity information from human occupants that gain access to the area. The data that is collected can be compared to the determined number of human occupants to confirm the identity of the determined number of human occupants within the area.

Confirming the number of human occupants can also include utilizing a number of soft sensors to determine a location of the number of human occupants. For example, the number of soft sensors can include a number of Wi-Fi hotspots to collect data from the number of human occupants. The data that is collected from the number of human occupants can include connections made between mobile devices (e.g., cell phones, computing devices, wireless communication devices, wireless access devices, etc.) of the number of human occupants and the number of Wi-Fi hotspots placed throughout a building. For example, a particular human occupant can be tracked through a number of areas by utilizing a connection between a mobile device on the particular human occupant and the number of Wi-Fi hotspots. The data relating to the location of the number of human occupants can be utilized to confirm that the particular human occupant is within the area determined to include the particular human occupant from the high frequency sensor.

At box 106 the method 100 can include altering a number of environmental settings for the area based on the determined number of human occupants. Altering the number of environmental settings can include altering a number of settings of an HVAC system. For example, a performance of the HVAC system can be altered based on the determined quantity of human occupants within an area. That is, the number of settings of the HVAC system can utilized to optimize output and energy conservation based on the determined number of human occupants within a number of areas of a building.

The determination of the number of human occupants from the high frequency sensor and the number of soft sensors can provide real time occupancy information (e.g., the number of human occupants, a quantity of human occupants, etc.) and identification information for the number of areas. The real time occupancy information can include an accurate quantity of the number of human occupants within the area (e.g., the number of areas, etc.). The real time occupancy information can be utilized to develop a number of occupancy patterns within the building. For example, the real time occupancy information can be utilized to develop occupancy patterns that include increases and decreases that occur regularly at corresponding dates and times.

In addition, the real time occupancy information can include identity information for each of the determined number of human occupants within the area. The real time occupancy information can increase the HVAC system energy conservation by altering the settings of the HVAC system in real time to accommodate for the real time quantity of the number of human occupants within each area of a building.

Figure 2:
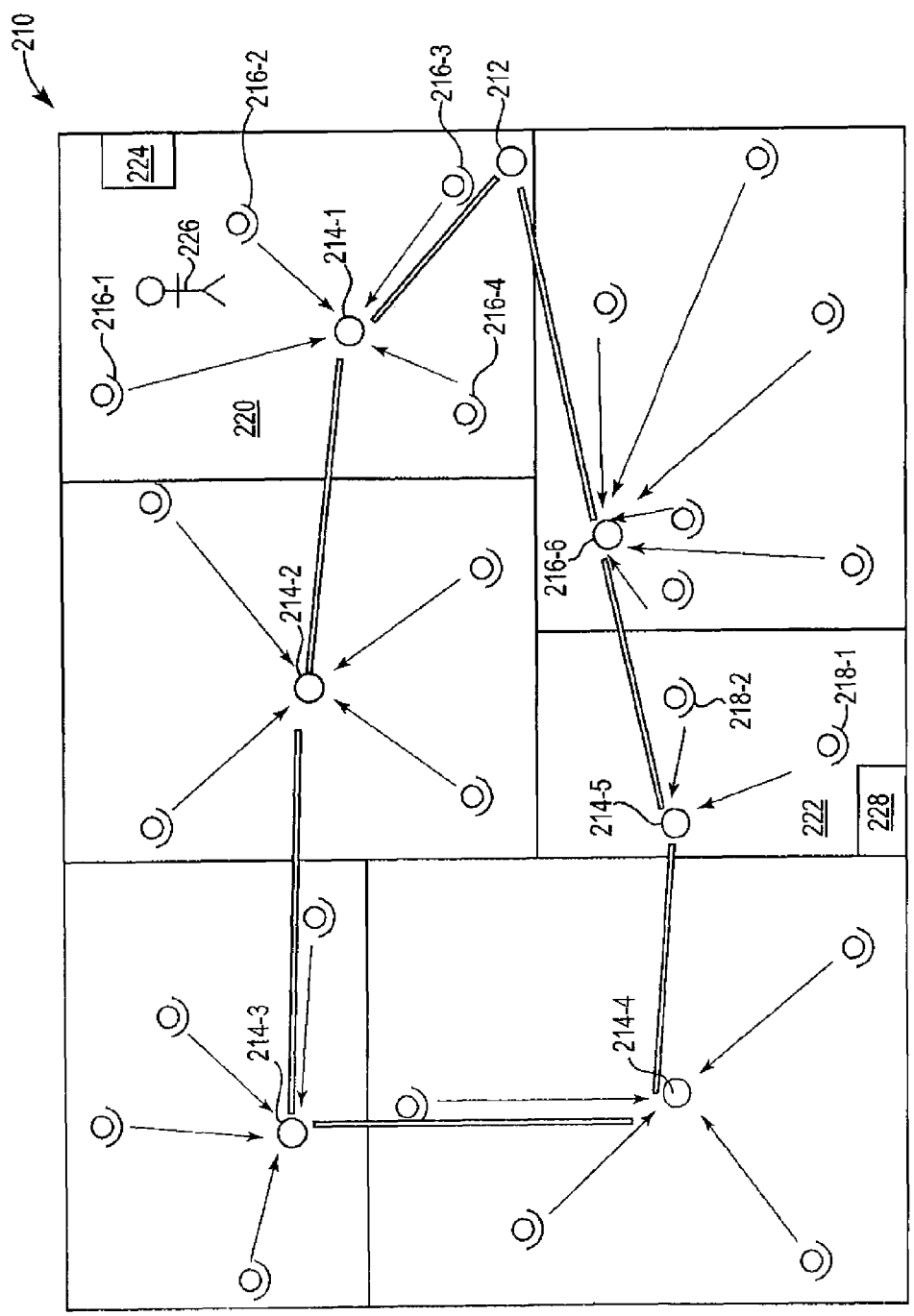
FIG. 2 illustrates an example of an occupancy based energy optimization system in accordance with one or more embodiments of the present disclosure.

FIG. 2 illustrates an example of an occupancy based energy optimization system 210 in accordance with one or more embodiments of the present disclosure. The occupancy based energy optimization system 210 can be utilized to determine real time occupancy of a number of areas 220, 222 and utilize the real time occupancy to alter a number of HVAC system settings to accommodate the real time occupancy of the number of areas 220, 222. Altering the number of HVAC system settings in real time to accommodate the real time occupancy of the number of areas 220, 222 can increase the efficiency of the HVAC system without sacrificing environment controls within areas that have a number of human occupants.

The occupancy based energy optimization system 210 can include a number of high frequency sensors (e.g., microwave sensors, etc.) within each of the number of areas 220, 222. For example, area 220 can include high frequency sensors 216-1, 216-2, 216-3, 216-4. Each of the number of high frequency sensors within each of the number of areas 220, 222 can be communicatively coupled (e.g., connected via a communication path, etc.) to an area router 214-1, 214-2, . . . , 214-6. The area router 214-1, 214-2, . . . , 214-6 can receive occupancy information from the number of high frequency sensors 216-1, 216-2, 216-3, 216-4. The occupancy information can include a quantity of human occupants as well as a location of non-human occupants 224, 228 (e.g., chair, desk, table, sofa, etc.).

As described herein, the number of high frequency sensors 216-1, 216-2, 216-3, 216-4 can utilize high frequency wave pulses (e.g., microwave pulses, etc.) to determine a size and/or shape of the number of objects within the number of areas 220, 222. In addition, the number of high frequency sensors 216-1, 216-2, 216-3, 216-4 can utilize high frequency wave pulses to determine a speed and/or movement of the number of objects within the number of areas 220, 222.

Utilizing the determined size and speed of the number of objects within the number of areas 220, 222, the high frequency sensors 216-1, 216-2, 216-3, 216-4 can determine a quantity of human occupants within each of the number of areas 220, 222. For example, the high frequency sensors 216-1, 216-2, 216-3, 216-4 within area 220 can utilize high frequency wave pulses to determine that there is a human occupant 226 within area 220. In another example, the high frequency sensors 216-1, 216-2, 216-3, 216-4 within area 220 can utilize high frequency wave pulses to determine that there is a non-human occupant 224 within area 220. The number of high frequency sensors can send the determined quantity of human occupants 226 and non-human occupants 224 to the area router 214-1. The area router 214-1 can send the occupancy information to a central computing device 212 (e.g., computing device, etc.).

Figure 3:
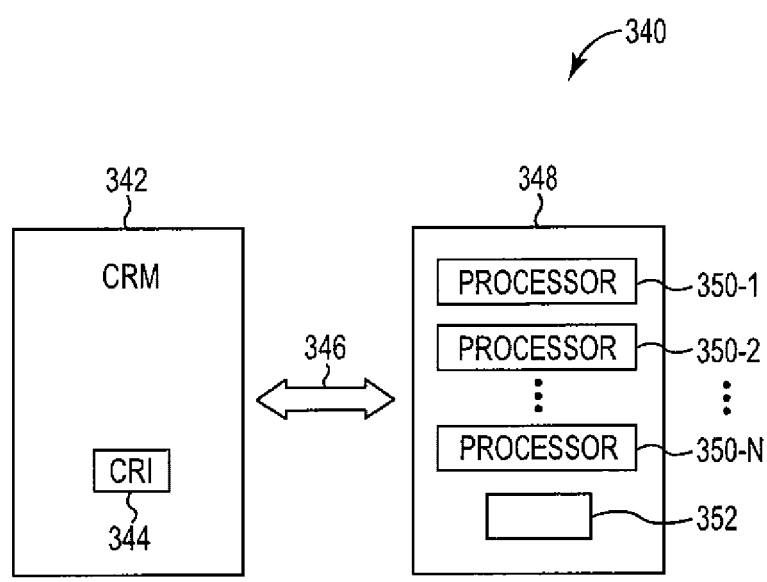
FIG. 3 illustrates a block diagram of an example of a computing device in accordance with one or more embodiments of the present disclosure.

The central computing device 212 can include a computing device 340 as referenced in FIG. 3. The central computing device can receive occupancy information from each of the area routers 214-1, 214-2, . . . , 214-6. For example, the central computing device 212 can receive occupancy information from area router 214-1 that includes information relating to the human occupant 226 within area 220. In addition, the central computing device 212 can receive occupancy information from area router 214-5 that includes information relating to non-human occupant 228 within area 222. That is, the central computing device 212 can receive occupancy information from area router 214-5 that includes information of no human occupants within area 222.

As described herein, the central computing device 212 can receive occupancy information from a number of soft sensors (e.g., Wi-Fi access points, calendar software, instant messaging software, time of day software, security systems, etc.). The information can include expected occupancy of a number of human occupants. The central computing device 212 can utilize the occupancy information from the number of soft sensors to confirm and/or identify an occupant within an area. For example, the central computing device can receive calendar information and/or security information relating to human occupant 226. The calendar information can include information from calendar software that is utilized by the human occupant 226. The security information can include information relating to the human occupant utilizing a security system to access area 220.

The central computing device 212 can utilize the received occupancy information from the number of area routers 214-1, 214-2, . . . , 214-6 and the received occupancy information from the number of soft sensors to determine a quantity of human occupants within each of the number of areas 220, 222. The central computing device 212 can be communicatively coupled to an environmental control system (e.g., HVAC system, etc.). The central computing device 212 can alter a number of settings of the HVAC system based on the quantity of human occupants within each of the number of areas 220, 222. For example, the central computing device 212 can increase an efficiency of the HVAC system by applying cooling and/or heating resources to accommodate the determined quantity of human occupants within each of the number of areas 220, 222.

FIG. 3 illustrates a block diagram of an example of a computing device 340 in accordance with one or more embodiments of the present disclosure. The computing device 340 can include a communication interface (e.g., wireless network interface controller, IEEE 802.11 adapters, etc.) for receiving wireless data. The communication interface can be integrated in the computing device 340 and/or be an external card.

The computing device 340, as described herein, can also include a computer readable medium (CRM) 342 in communication with processing resources 350-1, 350-2, . . . , 350-N. CRM 342 can be in communication with a device 348 (e.g., a Java® application server, among others) having processor resources 350-1, 350-2, . . . , 350-N. The device 348 can be in communication with a tangible non-transitory CRM 342 storing a set of computer-readable instructions (CRI) 344 (e.g., modules) executable by one or more of the processor resources 350-1, 350-2, . . . , 350-N, as described herein. The CRI 344 can also be stored in remote memory managed by a server and represent an installation package that can be downloaded, installed, and executed. The device 348 can include memory resources 352, and the processor resources 350-1, 350-2, . . . , 350-N can be coupled to the memory resources 352.

Processor resources 350-1, 350-2, . . . , 350-N can execute CRI 344 that can be stored on an internal or external non-transitory CRM 342. The processor resources 350-1, 350-2, . . . , 350-N can execute CRI 344 to perform various functions. For example, the processor resources 350-1, 350-2, . . . , 350-N can execute CRI 344 to perform a number of functions (e.g., determine an identity of the quantity of human occupants within the area based on the received quantity of human occupants, the scheduling data, and the security data, etc.). A non-transitory CRM (e.g., CRM 342), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), as well as other types of computer-readable media.

The non-transitory CRM 342 can also include distributed storage media. For example, the CRM 342 can be distributed among various locations.

The non-transitory CRM 342 can be integral, or communicatively coupled, to a computing device, in a wired and/or a wireless manner. For example, the non-transitory CRM 342 can be an internal memory, a portable memory, a portable disk, or a memory associated with another computing resource (e.g., enabling CRIs to be transferred and/or executed across a network such as the Internet).

The CRM 342 can be in communication with the processor resources 350-1, 350-2, . . . , 350-N via a communication path 346. The communication path 346 can be local or remote to a machine (e.g., a computer) associated with the processor resources 350-1, 350-2, . . . , 350-N. Examples of a local communication path 346 can include an electrical bus internal to a machine (e.g., a computer) where the CRM 342 is one of volatile, non-volatile, fixed, and/or removable storage medium in communication with the processor resources 350-1, 350-2, . . . , 350-N via the electrical bus. Examples of such electrical buses can include Industry Standard Architecture (ISA), Peripheral Component Interconnect (PCI), Advanced Technology Attachment (ATA), Small Computer System Interface (SCSI), Universal Serial Bus (USB), among other types of electrical buses and variants thereof.

The communication path 346 can be such that the CRM 342 is remote from the processor resources e.g., 350-1, 350-2, . . . , 350-N, such as in a network relationship between the CRM 342 and the processor resources (e.g., 350-1, 350-2, . . . , 350-N). That is, the communication path 346 can be a network relationship. Examples of such a network relationship can include a local area network (LAN), wide area network (WAN), personal area network (PAN), and the Internet, among others. In such examples, the CRM 342 can be associated with a first computing device and the processor resources 350-1, 350-2, . . . , 350-N can be associated with a second computing device (e.g., a Java® server).

As described herein, a "module" can include computer readable instructions (e.g., CRI 344) that can be executed by a processor to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system, comprising:
    a high frequency sensor to:
        send wave pulses through an area and determine changes in reflections of the wave pulses to determine a size and movement of objects within the area;
        determine a location of non-human occupants within the area; and
        determine a quantity of human occupants within the area based on a comparison of the determined size and movement of objects within the area to a predetermined relative size and movement of potential human occupants and the determined location of non-human occupants within the area;
    a soft sensor to confirm the quantity of human occupants based on an expected location of the potential human occupants utilizing soft sensor data that is specific to an identity of each of the potential human occupants, wherein the soft sensor data includes calendar information, security access information for the area specific to the identity of each of the potential human occupants, and connections between access points within the area and mobile computing devices associated with the potential human occupants; and
    a computing device coupled to the high frequency sensor and soft sensor to:
        generate occupancy data within the area based on the determined quantity of human occupants and confirmed quantity of human occupants;
        determine real time occupancy of the area based on the occupancy data; and
        alter environmental settings for the area based on the real time occupancy of the area and a particular outdoor temperature.

2. The system of claim 1, wherein the soft sensor includes, wireless access devices, mobile computing devices, security devices, and scheduling devices to determine the expected location of the potential human occupants.

3. The system of claim 1, wherein altering the environmental settings includes altering a number of settings of a heating air conditioning and ventilation (HVAC) system.

4. The system of claim 1, wherein the high frequency sensor utilizes Doppler radar techniques.

5. The system of claim 4, wherein the high frequency sensor is a microwave sensor.

6. The system of claim 4, wherein the high frequency sensor determines the number of human occupants by counting.

7. A method for adaptive optical zoom, comprising:
    sending, via a high frequency sensor, through an area to determine a size and speed of objects within the area based on changes in reflections of the wave pulses;
    determining, based on the changes in reflections of the wave pulses, a location of non-human occupants within the area;
    determining a quantity of human occupants within the area based on a comparison of the size and speed of the objects within the area to a predetermined relative size and speed of potential human occupants and based on the determined location of non-human occupants;
    confirming the quantity of human occupants based on an expected location of the potential human occupants utilizing soft sensor data that is specific to an identity of each of the potential human occupants, wherein the soft sensor data includes calendar information, security access information for the area specific to each of the potential human occupants, and connections between access points within the area and mobile computing devices associated with the human occupants; and altering environmental settings for the area based on the determined quantity of human occupants and a particular outdoor temperature.

8. The method of claim 7, comprising analyzing soft sensors that are utilized by the determined quantity of human occupants.

9. The method of claim 8, comprising comparing the analysis of the soft sensors with the determined quantity of human occupants within the area.

10. The method of claim 7, wherein determining a size and speed of the objects includes comparing the size and speed of the objects to predetermined objects.

11. The method of claim 7, wherein determining the quantity of human occupants includes confirming a quantity of non-human objects within the area utilizing soft sensors.

12. The method of claim 7, wherein altering the environmental settings includes altering a temperature setting for a heating, ventilation, and air conditioning (HVAC) system.

13. A system, comprising:
a high frequency sensor to:
send wave pulses through an area and determine changes in reflections of the wave pulses;
determine a location of non-human occupants within the area based on the reflections of the wave pulses;
determine a size and speed of objects within an area based on the reflections of the wave pulses; and
determine a quantity of human occupants within the area based on a comparison of a determined size and movement of objects within the area to a predetermined relative size and movement of potential human occupants and based on the determined location of non-human occupants within the area;
a soft sensor to:
access scheduling data relating to the potential human occupants within the area;
access security data relating to the potential human occupants within the area;
a computing device coupled to the high frequency sensor and to the soft sensor to:
receive the determined quantity of human occupants within the area;
receive the scheduling data and security data relating to the potential human occupants within the area;
determine an identity of the quantity of human occupants within the area based on the received quantity of human occupants, the scheduling data, and the security data; and
confirm the identity of the quantity of human occupants based on an expected location of the potential human occupants utilizing soft sensor data that is specific to an identity of each of the potential human occupants, wherein the soft sensor data includes calendar information, security access information for the area specific to each of the potential human occupants, and connections between access points within the area and mobile computing devices associated with the potential human occupants.

14. The system of claim 13, wherein the computing device alters environmental settings for the area based on the occupancy patterns of the area.

15. The system of claim 13, wherein the security data includes data received from a security system utilizing identification badges to access the area.

16. The system of claim 13, wherein the scheduling data includes calendar data received from a scheduling program utilized within the area.

17. The system of claim 13, wherein the high frequency sensor is a microwave sensor.

18. The system of claim 13, wherein the high frequency sensor determines a quantity of non-human objects within the area.

* * * * *